United States Patent [19]
Dzus, Jr.

[11] 3,787,024
[45] Jan. 22, 1974

[54] CAM LOCK AND BRACKET ASSEMBLY
[75] Inventor: Theodore Dzus, Jr., West Islip, N.Y.
[73] Assignee: Dzus Fastener Co., Inc., West Islip, N.Y.
[22] Filed: Apr. 7, 1972
[21] Appl. No.: 242,077

[52] U.S. Cl............................................ 248/361 B
[51] Int. Cl............................................... B25b 5/08
[58] Field of Search. 248/361 B, 25, 361 R; 85/9 R; 269/91, 93, 94, 229, 232; 24/221.2 A; 287/20 R

[56] References Cited
UNITED STATES PATENTS

| | | | |
|---|---|---|---|
| 1,251,516 | 1/1918 | Hardesty | 269/94 |
| 298,114 | 5/1884 | Owen | 269/232 |
| 1,415,938 | 5/1922 | Lott | 85/9 R |
| 1,801,222 | 4/1931 | Cayo | 269/93 |
| 1,145,260 | 7/1915 | Morton | 269/232 |
| 2,337,483 | 12/1943 | Marty | 24/221 A |

FOREIGN PATENTS OR APPLICATIONS

| | | | |
|---|---|---|---|
| 385,287 | 3/1931 | Great Britain | 269/93 |

Primary Examiner—Edward C. Allen
Attorney, Agent, or Firm—Kane, Dalsimer, Kane, Sullivan and Kurucz

[57] ABSTRACT

A cam lock and bracket assembly for fastening a removable member to a base. The assembly includes a stud, a bracket and a cam nut. The stud is adapted to be mounted to a base with the bracket adapted to be releasably engaged with a removable member in the base. A cam slot and cam follower are on the stud and cam nut arrangement whereby shifting of these elements permit the assembly to be shifted between a locked and unlocked position. In the locked position the bracket is held in fixed position with a force being exerted on the removable member to retain it in position. In the unlocked position the bracket is permitted to be shifted away from the removable member permitting it to be disassembled from the base. The assembly is designed to permit shifting between the locked and unlocked position to occur with a mere quarter turn of a revolution of the cam nut or the stud.

10 Claims, 5 Drawing Figures

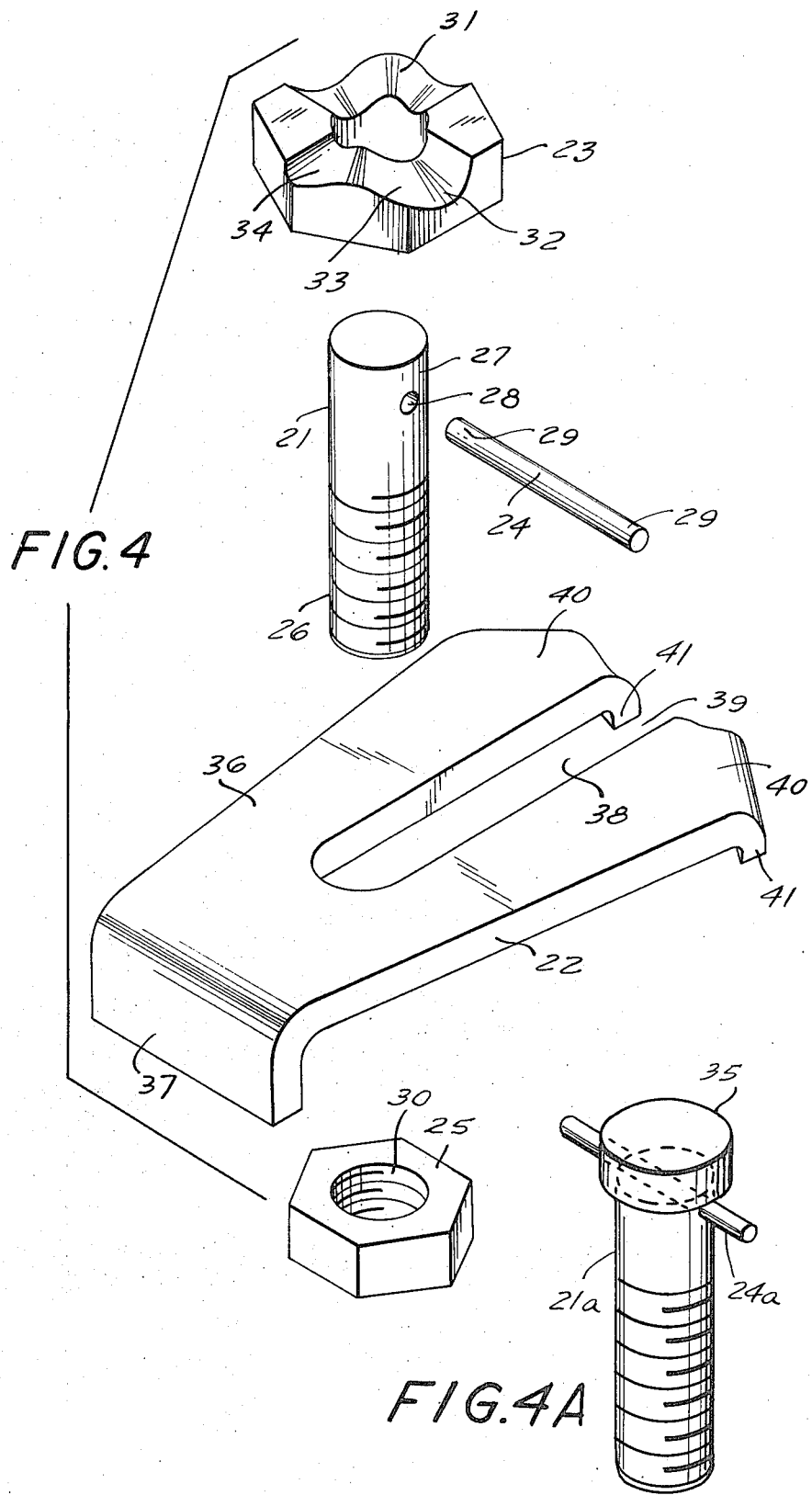

CAM LOCK AND BRACKET ASSEMBLY

BACKGROUND OF THE INVENTION

In many instances when one is working with motor vehicles such as racing cars, it is necessary to on occasion remove the distributor housing for the purpose of fine adjustment of the contents for replacement of certain parts within the housing. Under racing conditions, time is of the essence and, therefore, it is of great advantage to be able to remove and replace the distributor housing as desired as quickly and efficiently as possible.

Known methods of mounting the distributor housing within the motor block include the use of a yoke type arrangement around a flanged shoulder on a distributor assembly. The yoke is bolted to the motor block. Disassembly of the bolt and yoke type of fastener is time consuming and cumbersome. As stated above, this is an extreme disadvantage when speed is a criteria of the work to be done. Additionally, with the known fastener assembly even when the bolt has been loosened the distributor housing cannot be removed from the motor block. The yoke still surrounds the flanged portion of the housing and prevents complete removal. The bolt must be completely disassembled from the motor block so that the bolt and yoke assembly along with the distributor housing can be removed as a unit. In turn, when it is desired to reassemble the distributor to the motor block, the yoke, distributor housing and bolt must be refastened as a unit with the bolt being once again tightly mounted to the motor block. This is particularly true with motor vehicles where considerable vibration is present during running of the motor and loosening of the distributor assembly could cause malfunction or at least disturb the fine tuning of the engine.

A cam lock and bracket assembly which can be easily locked and unlocked to disassemble and assemble a removable member with resepct to a base is also applicable in factory work such as in milling operations where jigs are utilized. It is often desirable from a manufacturing time aspect to have a fastening assembly which can be easily and quickly shifted between the locked and unlocked position to permit rapid and efficient handling of jigs with respect to a fixed work area.

SUMMARY OF THE INVENTION

Thus, with the above considerations in mind, it is among the primary objectives of the present invention to provide a cam lock and bracket assembly for fastening a removable member to a base which can be quickly and easily shifted between a locked and unlocked position with a minimum amount of time and effort. The assembly is of low cost construction and a minimum number of parts and requires a minimum amount of operator skill. Additionally, the assembly is designed to be highly resistant to loosening subject to vibration thereby providing a positive fastener mechanism.

Thus, a cam lock and bracket assembly is provided for fastening a removable member to a base which includes a stud having a rear end adapted to be mounted to the base and a forward end. A bracket having a slot therein to receive the stud therethrough and having a finger portion extending laterally from the stud is also provided. A cam nut is present to be removably and rotatably mounted on the forward end of the stud and positioned to retain the bracket on the stud in fixed position with respect to the base. The finger portion of the bracket is adapted to be positioned in engagement with the removable member on the base. One of the stud and the cam nut has a pin thereon and the other has a slot thereon so that when the cam nut is positioned on the stud mounted on the base and is rotated with respect thereto in one direction the pin will follow the cam slot into the locked position thereby locking the bracket in fixed position with respect to the base. This causes the finger portion positioned in engagement with the removable member to fasten the member to the base. When the cam nut is rotated in a second direction the pin will follow the cam slot into the unlocked position thereby permitting the bracket to be moved with respect to the base and the finger portion to free the member for remvoal from the base.

With the above objectives, among others, in mind, reference is had to the attached drawings.

BRIEF DESCRIPTION OF THE DRAWINGS

In the drawings:

FIG. 4 is an exploded perspective view of the cam lock and bracket assembly of the invention; and FIG. 4a is a perspective view of an alternate embodiment of the stud for use as part of the cam lock and bracket assembly of the invention.

DESCRIPTION OF THE PREFERRED EMBODIMENT

Figure 1:
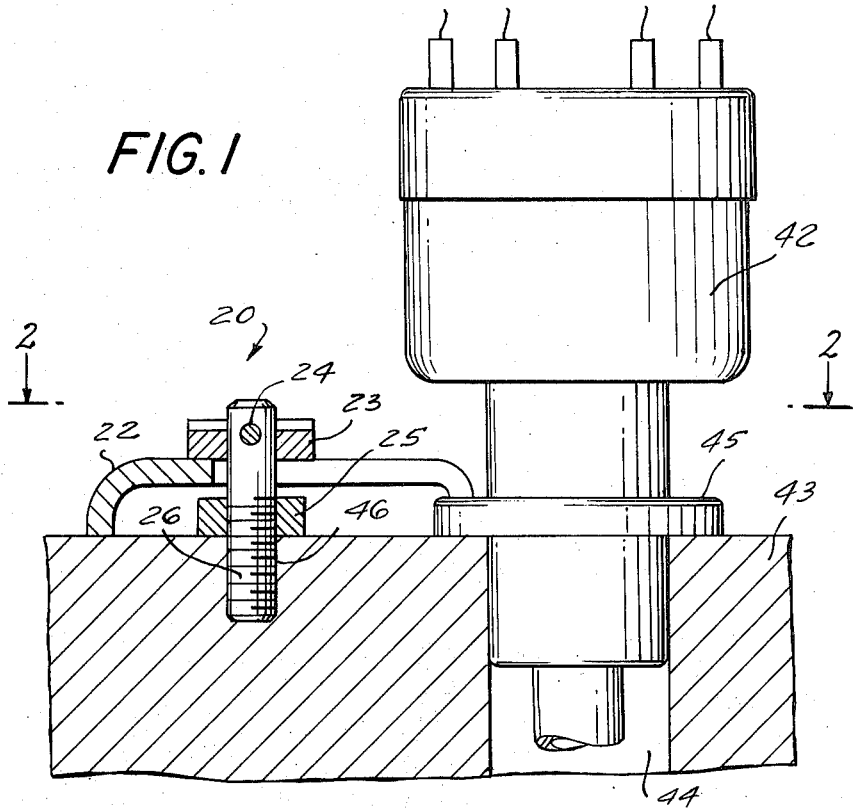
FIG. 1 is a partially sectional side elevation view of the cam lock and bracket assembly of the invention shown in position fastening a distributor housing to the engine block of an engine.

As discussed above, the cam lock and bracket assembly of this invention is adaptable for use in many industrial environments including the handling of jigs in milling operations. HOwever, for the purpose of presenting one example of its use, the assembly will be described below in connection with a distributor housing in the motor block of a motor vehicle such as a racing car. This embodiment is depicted in particular in FIGS. 1 and 2 of the drawings.

The specific component parts of the assembly 20 are shown in detail in FIG. 4 of the drawings. These components include a stud 21, a bracket 22, a cam nut 23 and a pin or cam follower 24. For purposes of the embodiment described, a lock nut 25 is also shown in FIG. 4 to facilitate mounting of the assembly to the engine block of a racing car. As shown, the stud 21 includes a threaded end portion 26 and an opposing end portion 27 which contains a passageway 28 diametrically therethrough. Stud 21 is substantially cylindrical in configuration. A pin 24 extends through passageway 28 in stud 21 and is greater in length than the diameter of stud 21 so that there are exposed tips extending laterally from stud 21 which form cam followers 29.

Lock nut 25 is a common type of nut having a hexagonal outer configuration for ease of handling and a threaded inner surface 30 adapted to interengage with the threaded rear end portion 26 of stud 21.

Similarly, the lower portion of cam nut 23 and its undersurface are similar in configuration and construction to lock nut 25. However, the upper surface of cam nut 23 includes a pair of diametrically opposed similar cam surfaces 31. Each cam surface 31 includes a lower recess 32, an interconnected inclined surface 33 which terminates in an upper detent 34. Each cam follower tip 29 of pin 24 is designed to mate with each cam slot 31 in operating cooperation therewith in moving the assembly between the locked and unlocked position. Naturally, should it be desired to use more than one pin additional cam surfaces can also be provided to accommodate the additional pin projections. This concept would be a matter of choice depending upon the relative strength desired for the assembly for a particular use.

Under certain circumstances, it may be desirable to provide an additional shoulder 35, as depicted in FIG. 4a, above passageway 28 and pin 24 on the outer surface of stud 21 to provide additional support to pin 24. Occasionally, when pin 24 is moved to the locked position in cam slots 31 it is subjected to considerable force which is transmitted as the locking force and therefore additional support would be of value in lessening the wear and tear on pin 24.

The above described stud, pin, lock nut and cam nut may be of any conventional type of rigid metallic or plastic material commonly in use today. Additionally, bracket 22 may be of a metal or plastic material, however, bracket 22 should be resilient in nature and deflectable to facilitate movement of the assembly between the locked and unlocked position. Although there are many materials which will work satisfactorily in this regard, spring steel has been found to be effective in the embodiments shown in the drawings.

Bracket 22 has a main body portion 36 terminating at one end in a perpendicularly extending flange 37. A slot 38 of sufficient width to receive stud 21 extends from the central portion or body 36 to the exterior of bracket 22 to form an opening 39 in the forward portion of bracket 22. Presence of slot 38 divides the forward portion of bracket 22 into a pair of extending fingers 40. The terminal end portions of fingers 40 extend downward from the fingers so as to form a downward projection 41 on each finger. Downward projections 41 are substantially parallel to the rear perpendicular flange 37 on bracket 22. As will be described in detail below, the undersurface of projections 41 are positioned for engagement with a portion of a member to be fastened and the undersurface of rear portion 37 is positioned to be engaged with the support structure during the fastening and locking operation.

It should be kept in mind that although in the embodiment shown the cam surfaces are on the cam nut 23 and the cam follower or pin 24 is mounted on the stud 21, other embodiments of assembly 20 are readily apparent. For example, portion 27 of stud 21 could contain the cam surfaces in which case pin 24 would be mounted on cam nut 23. The remainder of the assembly would be identical to that shown and the operation would be similar to that described below in connection with the depicted embodiment.

Figure 2:
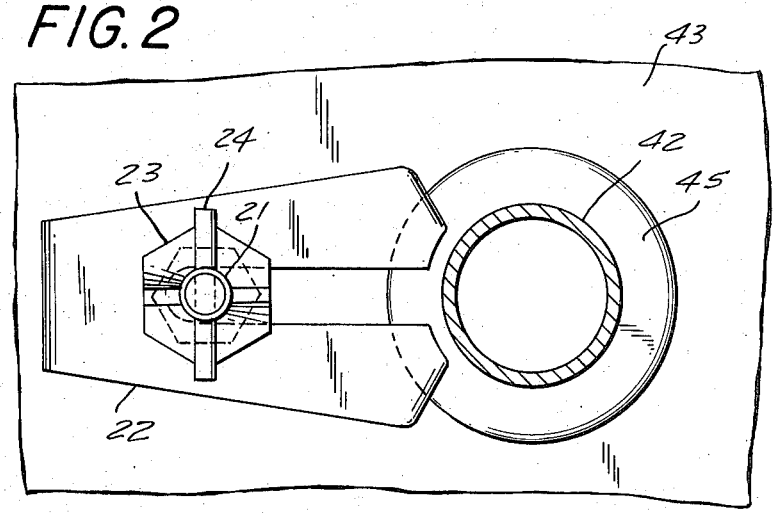
FIG. 2 is a sectional top view thereof taken along the plane of line 2—2 of FIG. 1.

Turning to consideration of operation of the embodiment shown, reference is made in particular to FIGS. 1 and 2. Assembly 20 is shown in the locked position fastening a distributor housing 42 of a motor vehicle such as a racing car to the engine block 43 of the vehicle. Engine block 43 has a recess 44 to receive a portion of the distributor housing and assembly 42 which contains an annular flange 45 which seats against the upper surface of engine block 43 when the distributor housing 42 is properly positioned. Annular flange 45 forms the engaging surface for assembly 20 to lock the removable distributor housing in place.

Threaded end 26 of stud 21 is interengaged with the threaded hole 46 in engine block 43. To positively fix the engaged position of stud 21 in engine block 43, lock nut 25 is threaded on stud 21 until its bottom surface engages with the upper surface of engine block 43. In this position, stud 21 is mounted in fixed position on engine block 43. As shown, pin 24 extends through opening 28 in upper portion 27 of stud 21 so that cam follower tips 29 extend from opposite sides of stud 21. Bracket 22 is then engaged with stud 21 by passing stud 21 through opening 39 into slot 38. Bracket 22 is extended until tips 41 bear against the upper surface of annular flange 45 on the distributor assembly. In this position, the undersurface of tips 41 engage with distributor housing flange 45 and the undersurface of perpendicular projection 37 engages with the upper surface of engine block 43.

Figure 3:
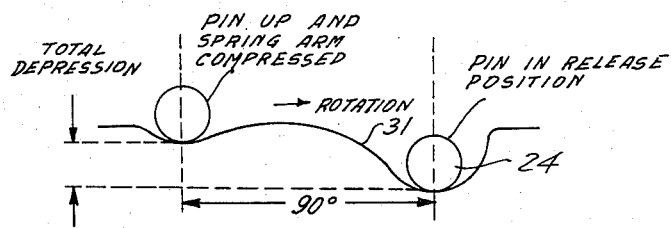
FIG. 3 is a schematic representation showing the travel path and terminal positions of the pin with respect to the cam surface of the assembly of the invention including reference to the amount of rotation and deflection of the assembly.

Prior to positioning of pin 24 in opening 28, cam nut 23 is slipped over the upper end of stud 21 until its undersurface bears against the upper surface of bracket 22. Pin 24 is then inserted in opening 28 with follower tips 29 resting in opposing lower recesses 32 of cam slots 31. This completes the assembly with the lock being in the release position. FIG. 3 shows the position of pin 24 in cam slot 31 at the lowest point in the cam slot which is the released position. In this position, it is possible to reciprocally slide bracket 22 along the upper surface of engine block 43 between the engaged and disengaged position with the upper surface of flange 45 of the distributor housing.

Locking of the assembly 20 is accomplished in a quick and efficient manner. Rotation of cam nut 23 approximately 90° will cause tips 29 of pin 24 to follow cam surface 31 into the locked position where the tips 29 are located in detent 34 at the upper extremities of cam slots 31. This movement of pin 24 applies a force to the undersurface of cam nut 23 and consequently to bracket 22 causing a simultaneous deflection of resilient bracket 22 and transmitting the force through the bracket at its end portions 41 and 37 to flange 45 and motor block 43 respectively. This force retains housing 42 in fixed position in motor block 43. The amount of deflection or depression of bracket 22 as shown in FIG. 3 is approximately equal to the vertical travel of pin 24 as it follows cam slots 31. As previously discussed, detents 34 form a positive seating position for pin 24 in the locked position so that vibration will not cause pin 24 to be displaced from the locked position and consequently free the distributor housing 43 from the fastened position.

Unlocking of assembly 20 is accomplished just as quickly and efficiently as the locking operation. A mere quarter turn of cam nut 23 in the opposite direction with a little extra initial force to remove pin 24 from detents 34 will cause pin 24 to follow cam slot 31 into the release position. This operation releases the depressive force on bracket 22 permitting the resilient bracket to return to its initial configuration and to releave the force supplied to flange 45 and motor block 43. Bracket 22 can then be easily laterally slid away from engagement with flange 45 permitting distributor housing assembly 42 to be immediately removed from engine block 43. Naturally, reassembly and locking is accomplished just as fast by placing housing 42 back in engine block 43, sliding bracket 22 into engagement with flange 45 and rotating cam nut 23 to place pin 24 once again in the locked position. It can be readily seen how the entire operation for locking and unlocking assembly 20 facilitates high speed removal and replacement of distributor housing 42 as desired. Additionally, it can be easily seen how assembly 20 is adaptable to other industrial uses such as in milling operations where it is sometimes advantageous to fasten and unfasten jigs quickly and efficiently with respect to fixed surfaces.

Thus, the above discussed objectives of the invention are effectively attained.

I claim:

1. A cam lock and bracket assembly for fastening a removable member to a base comprising:

a stud having a rear end adapted to be mounted to the base and a forward end;

a bracket having a slot therein to receive the stud therethrough and having a finger portion extending laterally from said stud;

a cam nut removably and rotatably mounted on the forward end of said stud and positioned to retain said bracket on said stud in fixed position with respect to the base;

the finger portion being adapted to be positioned in engagement with the removable member on the base;

one of said stud and said cam nut having a pin thereon and the other having a cam slot thereon so that when said cam nut is positioned on said stud mounted on the base and rotated with respect thereto in one direction, said pin will follow said cam slot into the locked position thereby locking said bracket in fixed position with respect to the base and causing said finger portion positioned in engagement with said member to fasten said member to the base, and when said nut is rotated in a second direction said pin will follow said cam slot into the unlocked position thereby permitting said bracket to be moved with respect to said base and said finger portion to free said member for removal from said base;

the surface forming the cam slot on the cam lock extending from an upper locking point along a declining surface to a lower release point in the travel path of said pin and a detent is provided at the upper locking point to assist in retaining the pin in locked position;

the bracket being resilient and deflectable so that when the pin is shifted between the locked and unlocked position with respect to the cam slot the bracket will automatically deflect and will apply and remove a force to the removable member as desired;

the resilient and deflectable bracket having downward extending end portions so that when one end is positioned against the base and the other end is positioned against the removable member the central portion of the bracket will be spaced above said brace and removable member so that the bracket can deflect when force is applied to it to be transmitted to the base and removable member and when the force is released the resilient bracket will return to its normal configuration;

adjustable fastening means on the rear end of the stud and adapted to cooperate with a base to facilitate adjustment of the assembly with respect to the base as desired and to facilitate retention of the assembly in fixed position with respect to the base subsequent to the desired adjustment; and the cam slot being of a predetermined length whereby the assembly may be shifted between the locked and unlocked position by approximately one-quarter of a complete revolution between the cam nut and the stud.

2. The invention in accordance with claim 1 wherein said pin is mounted on the forward end portion of said stud and extends radially therefrom, the upper surface of said cam nut forming the cam slot to receive the pin mounted on the forward end portion of the stud.

3. The invention in accordance with claim 2 wherein the pin extends from the forward end portion of the stud at two diametrically opposed positions thereon and there are two diametrically opposed cam slots on the upper surface of said cam nut to permit each cam slot to simultaneously engage with one of the extending portions of said pin.

4. The invention in accordance with claim 3 wherein an annular shoulder is on said stud and is positioned against the side of the pin opposite to the engaging surface of the pin with the cam surface of the cam nut to provide additional support to said pin when the assembly is in the locked position.

5. The invention in accordance with claim 1 wherein the removable member is the distributor housing and the base is the engine block of a motor vehicle.

6. The invention in accordance with claim 1 wherein the assembly is mounted to a base and is positioned so as to releasably fasten a removable member to the base.

7. The invention in accordance with claim 1 wherein the bracket is of a spring steel material.

8. The invention in accordance with claim 1 wherein the slot in said bracket is of sufficient length to permit the bracket to be reciprocated with respect to said stud when the assembly is in the unlocked position.

9. The invention in accordance with claim 8 wherein the slot is open to the exterior of said bracket at one end thereof to permit removal of said bracket from the remainder of the assembly when the assembly is in the unlocked position.

10. The invention in accordance with claim 1 wherein the rear end of the stud has a threaded outer surface to facilitate its threaded interengagement with a base and a locknut is provided on said assembly in threaded interengagement with the stud and being adapted to bear against the base when the stud is mounted to the base to facilitate the retention of the assembly in fixed position with respect to the base when it is mounted thereon.

* * * * *